(12) United States Patent
Rueckriem

(10) Patent No.: US 8,498,594 B2
(45) Date of Patent: Jul. 30, 2013

(54) DIVERSITY RECEIVER BASED ON DOPPLER FREQUENCY SHIFT VALUE

(75) Inventor: Reinhard Rueckriem, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 301 days.

(21) Appl. No.: 13/076,112

(22) Filed: Mar. 30, 2011

(65) Prior Publication Data

US 2012/0076242 A1 Mar. 29, 2012

Related U.S. Application Data

(62) Division of application No. 11/510,318, filed on Aug. 25, 2006, now Pat. No. 7,925,230.

(51) Int. Cl.
*H04B 1/16* (2006.01)
(52) U.S. Cl.
USPC .......................................... 455/140; 455/574
(58) Field of Classification Search
USPC ................ 455/101, 132, 133, 134, 135, 136, 455/140, 272, 273, 275, 277.1, 277.2, 574
See application file for complete search history.

(56) References Cited

U.S. PATENT DOCUMENTS

| | | | | |
|---|---|---|---|---|
| 566,364 A * | 8/1896 | Wilson | ........................... | 403/175 |
| 4,823,398 A * | 4/1989 | Hashimoto | ................... | 455/134 |
| 5,263,180 A * | 11/1993 | Hirayama et al. | ............ | 455/139 |
| 5,687,194 A * | 11/1997 | Paneth et al. | .................. | 375/283 |
| 6,023,615 A * | 2/2000 | Bruckert et al. | ............ | 348/14.08 |
| 6,473,601 B1 * | 10/2002 | Oda | ................................ | 455/132 |
| 6,940,932 B2 * | 9/2005 | Henriksson | .................... | 375/347 |
| 7,024,168 B1 * | 4/2006 | Gustafsson et al. | ........... | 455/135 |
| 7,146,134 B2 * | 12/2006 | Moon et al. | ................ | 455/67.11 |
| 7,277,679 B1 * | 10/2007 | Barratt et al. | .................. | 455/101 |
| 7,430,168 B2 * | 9/2008 | Yamaura et al. | ............ | 370/230.1 |
| 7,590,432 B2 * | 9/2009 | Behzad et al. | ................ | 455/574 |
| 7,929,921 B2 * | 4/2011 | Love et al. | ..................... | 455/101 |
| 2004/0219959 A1 * | 11/2004 | Khayrallah et al. | ........ | 455/575.7 |

OTHER PUBLICATIONS

File History from U.S. Appl. No. 11/510,318: Jul. 2, 2010 Non-Final Rejection; Jul. 10, 2009 Non-Final Rejection; Jan. 25, 2010 Final Rejection; Dec. 17, 2010.

* cited by examiner

*Primary Examiner* — Blane J Jackson
(74) *Attorney, Agent, or Firm* — SpryIP, LLC

(57) ABSTRACT

A diversity receiver includes a plurality of antennas to receive radio frequency signals. A plurality of receiver circuits are each coupled to a respective one of the plurality of antennas to process the received radio frequency signals, and a channel estimator is coupled to at least one of the receiver circuits to determine at least one of channel estimation values for the received radio frequency signals. A controller is coupled to the channel estimator and to at least one of the receiver circuits and selectively activates or deactivates the at least one receiver circuit based on the determined at least one channel estimation value.

15 Claims, 4 Drawing Sheets

DIVERSITY RECEIVER BASED ON DOPPLER FREQUENCY SHIFT VALUE

RELATED APPLICATIONS

This application is a Divisional application of co-pending U.S. patent application Ser. No. 11/510,318, which has a filing date of Aug. 25, 2006. The entire contents of the co-pending application are incorporated herein by reference.

FIELD OF THE INVENTION

This invention relates to receivers in general and more particularly to diversity receivers.

BACKGROUND OF THE INVENTION

In radio frequency transmission systems, signals that are transmitted between a transmitter and a receiver can deteriorate or be lost due to multi-path fading or shadowing. In these cases, diversity receivers may provide an improvement. Diversity receivers comprise two or more separate receiver circuits, each with its own antenna, and a combiner that combines the signals received by the individual antennas. Since the signals propagate from the transmitter to the individual antennas via different transmission channels and since each of the transmission channels experiences different multi-path fading and shadowing, a more accurate signal can be produced when combining the signals received by the individual antennas.

In one of many ways, diversity receivers receive signals which are so-called multi-carrier signals. Multi-carrier signals are produced by splitting a signal to be transmitted into a plurality of sub-signals, each of which is transmitted separately on an individual frequency carrier. A receiver receives the sub-signals from each of the carriers and recombines them to reproduce the original signal. In multi-carrier transmission systems, diversity receivers take advantage of the fact that the multi-path fading and shadowing on the different antennas is not the same so that, when one antenna receives a multi-carrier signal that comprises faded sub-signals, chances are that another antenna receives these sub-signals without fading. Combining the multi-carrier signals received by the individual antennas can thus mitigate fading.

SUMMARY OF THE INVENTION

According to one embodiment of the invention, a diversity receiver comprises a plurality of antennas, a plurality of receiver circuits, a channel estimator and a controller. The antennas receive radio frequency signals. Each of the receiver circuits is coupled to one of the antennas to process the received radio frequency signals. The channel estimator is coupled to at least one of the receiver circuits and determines channel estimation values for the received radio frequency signals. The controller is coupled to the channel estimator and to at least one of the receiver circuits. The controller selectively activates and deactivates the at least one receiver circuit depending on the determined channel estimation values.

According to another embodiment of the invention, a diversity receiver comprises a plurality of antennas, a plurality of receiver circuits, a Doppler frequency shift calculator and a controller. The antennas receive radio frequency signals. Each of the receiver circuits is coupled to one of the antennas to process the received radio frequency signals. The Doppler frequency shift calculator is coupled to at least one of the receiver circuits and determines Doppler frequency shift values for the received radio frequency signals. The controller is coupled to the Doppler frequency shift calculator and to at least one of the receiver circuits. The controller selectively activates and deactivates the at least one receiver circuit depending on the determined Doppler frequency shift values.

DETAILED DESCRIPTION OF THE INVENTION

Figure 1:
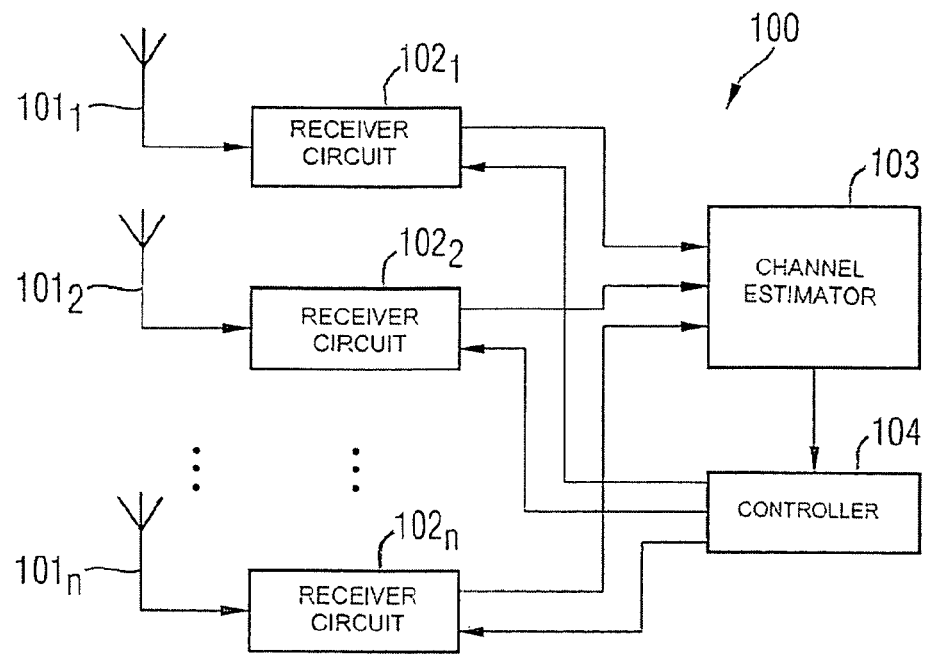
FIG. 1 schematically illustrates a diversity receiver 100 according to a first exemplary embodiment of the invention.

In the following, one or more aspects and/or embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, a block diagram of a diversity receiver 100 is shown which serves as an exemplary embodiment of one aspect of the invention. The diversity receiver 100 comprises a plurality of antennas $101_1$, $101_2$, ..., $101_n$, a corresponding number of receiver circuits $102_1$, $102_2$, ..., $102_n$, a channel estimator 103 and a controller 104.

Each receiver circuit $102_1$, $102_2$, ..., $102_n$ comprises an input terminal, an output terminal and a control terminal. The channel estimator 103 comprises input terminals and an output terminal. The controller 104 comprises an input terminal and output terminals.

Each antenna $101_1$, $101_2$, ..., $101_n$ is coupled to the input terminal of one of the receiver circuits $102_1$, $102_2$, ..., $102_n$. Each antenna $101_1$, $101_2$, ..., $101_n$ together with the corresponding receiver circuit $102_1$, $102_2$, ..., $102_n$ forms a diversity branch of the diversity receiver 100. The diversity receiver 100 comprises at least two diversity branches (n≧2), which are in one embodiment functionally equivalent.

The output terminal of at least one of the receiver circuits $102_1$, $102_2$, ..., $102_n$ is connected to one of the input terminals of the channel estimator 103. It can also be provided that the output terminals of all receiver circuits $102_1$, $102_2$, ..., $102_n$ are connected to the input terminals of the channel estimator 103 as shown in FIG. 1. The output terminal of the channel estimator 103 is connected to the input terminal of the controller 104. At least one output terminal of the controller 104 is connected to the control terminal of one of the receiver circuits $102_1, 102_2, \ldots, 102_n$. It may also be provided that each output terminal of the controller 104 is connected to one of the control terminals of the receiver circuits $102_1, 102_2, \ldots, 102_n$ as shown in FIG. 1.

During the use of the diversity receiver 100, the antennas $101_1, 101_2, \ldots, 101_n$ receive radio frequency signals and transfer the received radio frequency signals to the receiver circuits $102_1, 102_2, \ldots, 102_n$, respectively. The receiver circuits $102_1, 102_2, \ldots, 102_n$ process the received radio frequency signals and at least one of the receiver circuits $102_1, 102_2, \ldots, 102_n$ feeds its processed signals to the channel estimator 103. The channel estimator 103 determines channel estimation values for the received radio frequency signals. The channel estimation values are fed to the controller 104. The controller 104 selectively activates and deactivates at least one of the receiver circuits $102_1, 102_2, \ldots, 102_n$ via its control terminals depending on the determined channel estimation values.

In FIG. 1 a single channel estimator 103 determines the channel estimation values for all diversity branches or a number of the diversity branches. This is not to be taken in a limiting sense. The channel estimator 103 may for example also be comprised by the receiver circuits $102_1, 102_2, \ldots, 102_n$. For example, each diversity branch may comprise a separate channel estimator which determines the channel estimation values for the radio frequency signals received by that diversity branch.

Figure 2:
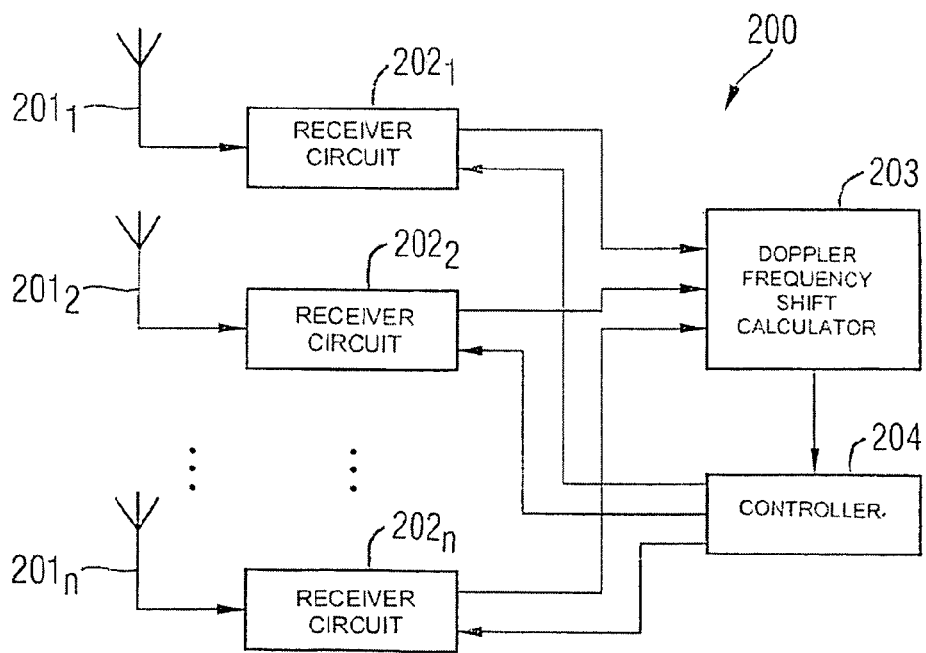
FIG. 2 schematically illustrates a further diversity 200 receiver according to a second exemplary embodiment of the invention.

Referring to FIG. 2, a block diagram of a diversity receiver 200 is shown which serves as an exemplary embodiment of a further embodiment of the invention. The diversity receiver 200 comprises a plurality of antennas $201_1, 201_2, \ldots, 201_n$, a corresponding number of receiver circuits $202_1, 202_2, \ldots, 202_n$, a Doppler frequency shift calculator 203 and a controller 204. The wiring of the components of the diversity receiver 200 is equivalent to the wiring of the components of the diversity receiver 100 shown in FIG. 1, wherein the external wiring of the Doppler frequency shift calculator 203 corresponds to the external wiring of the channel estimator 103. The diversity receiver 200 comprises at least two diversity branches ($n \geq 2$).

During the use of the diversity receiver 200 the antennas $201_1, 201_2, \ldots, 201_n$ receive radio frequency signals and transfer the received radio frequency signals to the receiver circuit $202_1, 202_2, \ldots, 202_n$, respectively. The receiver circuits $202_1, 202_2, \ldots, 202_n$ process the received radio frequency signals and at least one of the receiver circuits $202_1, 202_2, \ldots, 202_n$ feeds its processed signals to the Doppler frequency shift calculator 203. The Doppler frequency shift calculator 203 determines Doppler frequency shift values for the received radio frequency signals. The Doppler frequency shift values are fed to the controller 204. The controller 204 selectively activates and deactivates at least one of the receiver circuits $202_1, 202_2, \ldots, 202_n$ depending on the determined Doppler frequency shift values.

Analogously to the channel estimator 103 shown in FIG. 1, the Doppler frequency shift calculator 203 can for example also be implemented in the receiver circuits $202_1, 202_2, \ldots, 202_n$ or a number of the receiver circuits $202_1, 202_2, \ldots, 202_n$.

The diversity receivers 100 and 200 shown in FIGS. 1 and 2 may for example comprise all features or a selection of the features of the diversity receiver 300, which is described in the following.

Figure 3:
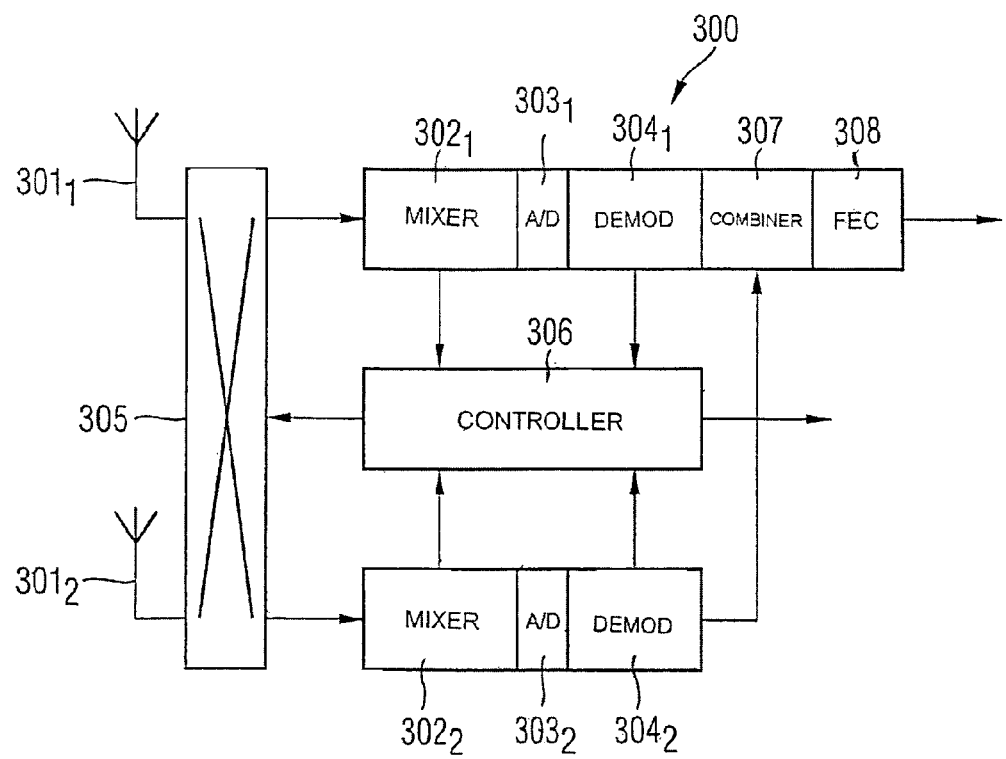
FIG. 3 schematically illustrates a further diversity receiver 300 according to a third exemplary embodiment of the invention.

A block diagram of the diversity receiver 300 is shown in FIG. 3. The diversity receiver 300 serves as another exemplary embodiment of the invention. The diversity receiver 300 comprises two diversity branches, but may also comprise more than two diversity branches. The diversity branches are functionally equivalent. One of the diversity branches, which is called upper diversity branch in the following, comprises an antenna $301_1$, a mixer circuit $302_1$, an analog-to-digital converter $303_1$ and a demodulator $304_1$. The other diversity branch, which is called lower diversity branch in the following, comprises an antenna $301_2$, a mixer circuit $302_2$, an analog-to-digital converter $303_2$ and a demodulator $304_2$. Furthermore, the diversity receiver 300 comprises an optional antenna switch 305, a controller 306, a combiner 307 and a forward error correction unit 308.

The antennas $301_1$ and $301_2$ are coupled to the respective mixer circuits $302_1$ and $302_2$ via the antenna switch 305. According to one embodiment of the invention, a low noise amplifier is connected between each antenna $301_1$ and $301_2$ and the antenna switch 305. The low noise amplifiers are not shown in FIG. 3. The mixer circuits $302_1$ and $302_2$ downconvert the radio frequency signals received on the antennas $301_1$ and $301_2$, respectively. The down-converted signals are fed to the analog-to-digital converters $303_1$ and $303_2$, respectively, to generate sampled signals. The demodulators $304_1$ and $304_2$ produce demodulated signals out of the sampled signals, respectively.

The demodulated signals produced by the demodulators $304_1$ and $304_2$ are transferred to the combiner 307. In FIG. 3 the combiner 307 is part of the upper diversity branch. Alternatively, the combiner 307 could be part of another diversity branch or could be separated from the diversity branches. The combiner 307 combines the demodulated signals in order to provide a composite signal with better signal quality than either signal alone. Combining can be carried out by using a common combining method, such as maximum ratio combining, carrier selection, equal gain combining or any other form of combining. The composite signal generated by the combiner 307 is input into the forward error correction unit 308. After the forward error correction the composite signal is provided for further processing.

Since the radio frequency signals received on the antennas $301_1$ and $301_2$ may be distorted due to multi-path propagation between a transmitter transmitting the radio frequency signals and the diversity receiver 300, it is intended according to one embodiment to correct the received signals. The correction mechanism is based on continuously repeated measurement of the channel characteristics of the transmission channels via which the radio frequency signals propagate to the antennas $301_1$ and $301_2$ (channel estimation). The information which is determined about the transmission channels during the channel estimation process is used for equalization of the received signals.

In the present exemplary embodiment of the invention each demodulator $304_1$ and $304_2$ comprises a channel estimator. The channel estimators could for example also be separated from the demodulators $304_1$ and $304_2$ or, alternatively, there could be a single channel estimator commonly used for both diversity branches.

In order to allow channel estimation in the diversity receiver 300, the transmitter transmits according to one embodiment pilot symbols which are known in the diversity receiver 300. The diversity receiver 300 receives the distorted pilot symbols, which are transmitted via the same transmission channels than the payload data, and compares them with the known pilot symbols. The quotient of the pilot symbols as received via a specific propagation path and the known pilot symbols then for example results in a channel estimation value, which is also known in the art as channel coefficient. The channel estimation value corresponds to the transfer function of the transmission channel at a given carrier frequency used for signal transmission. The channel estimation values allow to compensate the received signals for the rotation and magnitude change which occurred to the complex symbols in the transmission path resulting in a lower bit error rate.

According to one embodiment, the channel estimation values are used to decide whether it is necessary to use all of the diversity branches at a particular time or whether one of the diversity branches can be deactivated in order to reduce the overall power consumption of the diversity receiver 300. For example, if the channel estimation values indicate that the quality of the transmission channels is high, it is not necessary to use both of the diversity branches of the diversity receiver 300 and it can be decided that one diversity branch is deactivated. Once the quality of the transmission channel of the remaining active diversity branch gets worse, the deactivated diversity branch may be activated again. Proceeding this way is advantageous in the sense that power saving can be achieved during the time one of the diversity branches is deactivated. This is especially beneficial if the diversity receiver 300 is implemented into a cellular phone or any other mobile device.

The selective deactivation and activation of diversity branches is carried out by the controller 306. For that reason, the controller 306 receives the determined channel estimation values from the demodulators $304_1$ and $304_2$. The controller 306 selectively deactivates a diversity branch for example by turning off its power supply circuit or by disconnecting the diversity branch from the power supply circuit.

Many configurations are possible how the activation and deactivation of at least one of the diversity branches could be implemented in the diversity receiver 300 comprising two or more diversity branches. According to one embodiment, decision is made when the performance gain from using diversity outweighs the extra power consumption. For example, if the channel estimation values are higher than a predetermined threshold, it may be sufficient to use only one or a few of the diversity branches. All other diversity branches or a number of them can be deactivated. When the channel estimation values of the remaining active diversity branches drop below the same or a further predetermined threshold, the deactivated diversity branches or a predetermined number of them can be activated again.

Furthermore, before deactivating one or a number of the diversity branches, the diversity branch or branches can, for example, be determined that exhibit the best channel estimation values. These diversity branches can be selected for receiving the radio frequency signals while the other diversity branches are deactivated. For this reason, the diversity receiver 300 comprises the antenna switch 305 which is arranged between the antennas $301_1$ and $301_2$ and the mixer circuits $302_1$ and $302_2$. If it is found, for example, that the antenna $301_2$ receives radio frequency signals with a better quality than the antenna $301_1$ and the quality of the radio frequency signals received on the antenna $301_2$ is sufficiently high, the antenna switch 305 can connect the antenna $301_2$ to the mixer circuit $302_1$ and the controller 306 can deactivate the mixer circuit $302_2$, the analog-to-digital converter $303_2$ and the demodulator $304_2$.

If the diversity receiver 300 comprises more than two diversity branches, it can, for example, be provided that one or more diversity branches are deactivated when the channel estimation values of a predetermined number of diversity branches cross a predetermined threshold. If later the channel estimation values of a predetermined number of the remaining active diversity branches drop below a predetermined threshold, all deactivated diversity branches or a number of them can be activated again.

It can, for example, also be provided that deactivating and activating diversity branches is carried out in a staggered manner by using a plurality of thresholds. For example, if the channel estimation values of a predetermined number of diversity branches cross a first threshold, a predetermined number of diversity branches will be deactivated. If the channel estimation values of a predetermined number of the remaining active diversity branches cross a second threshold which is higher than the first threshold, a predetermined number of the remaining active diversity branches will be deactivated as well. This proceeding can be continued by using an arbitrary number of thresholds. Analogously, a plurality of thresholds can, for example, also be provided for activating the diversity branches.

For the data transmission between the transmitter and the diversity receiver 300 any possible data transmission standards can be used, such as GSM (global system for mobile communications) or UMTS (universal mobile telecommunications system) for example. Furthermore, the signals that are transmitted between the transmitter and the diversity receiver 300 can be multi-carrier signals. In this case, for example, OFDM (orthogonal frequency division multiplex) can be used as a modulation method. Moreover, the transmission system can, for example, be used for the broadcast transmission of digital terrestrial television. OFDM has been adopted as the modulation method in a number of systems for digital terrestrial television, such as DVB-T (digital video broadcasting-terrestrial), which can for example be used for the diversity receiver 300 as well.

If the transmitted radio frequency signals are multi-carrier signals, there are even more possibilities how the deactivation and activation of at least one of the diversity branches can be accomplished. This is because channel estimation values can be determined for the transmission channels of each sub-carrier to each antenna $301_1$ and $301_2$. A channel estimation value of a sub-carrier corresponds to the transfer function of the respective transmission channel of the sub-carrier at the frequency of the sub-carrier.

Figure 4:
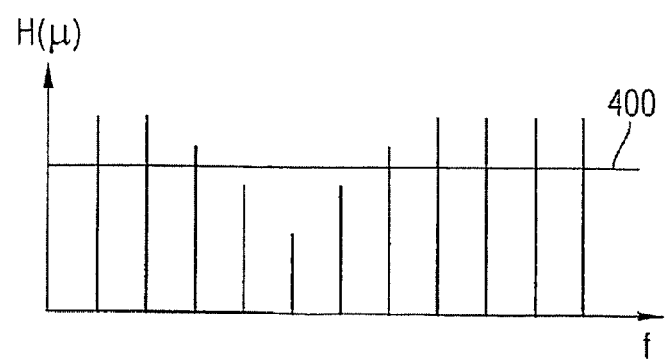
FIG. 4 schematically illustrates channel estimation values for several sub-carriers of a multi-carrier transmission system.

FIG. 4 shows a diagram in which channel estimation values $H(\mu)$ are plotted versus frequency f. The frequencies f are the carrier frequencies of the sub-signals of a multi-carrier signal. In one embodiment, one of the antennas $301_1$ and $301_2$ will be deactivated if the channel estimation values of a predetermined number of the sub-signals of a multi-carrier signal received on one or both antennas $301_1$ and $301_2$ is higher than a threshold level 400 shown in FIG. 4. Analogously, if the channel estimation values of a predetermined number of the sub-signals of a multi-carrier signal received on the remaining active antenna $301_1$ or $301_2$ is smaller than a further threshold level, the deactivated diversity branch $301_1$ or $301_2$ will be returned to its active mode. The aforementioned criteria on how to selectively activate and deactivate at least one diversity branch of the diversity receiver 300 in case the transmitted signals are multi-carrier signals can be combined with any other criterion described above.

According to another embodiment of the invention Doppler frequency shift values instead of channel estimation values are used to decide whether one or more of the diversity branches shall be deactivated. In a mobile communication system, a Doppler frequency shift occurs when the velocity vector of the transmitter differs from the velocity vector of the receiver. In this case the transmitter transmits signals with a frequency $f_0$, whereas the actual frequency at the receiver is $f_0+\Delta f$, wherein $\Delta f$ is the Doppler frequency shift. The Doppler frequency shift usually reduces the probability to detect transmitted data correctly.

According to one embodiment of the invention, the controller 306 of the diversity receiver 300 determines Doppler frequency shift values that characterize the Doppler frequency shift of the radio frequency signals received by the diversity receiver 300. The controller 306 for example activates all or a predetermined number of diversity branches if the Doppler frequency shift values are greater than a predetermined threshold, which is indicative of a certain relative speed of the diversity receiver 300 with respect to the transmitter. If the transmitter and the diversity receiver 300 are however stationary with respect to each other, the Doppler frequency shift is zero and the diversity may be reduced. Therefore it may be provided, for example, that at least one of the diversity branches will be deactivated if the Doppler frequency shift values drop below a predetermined threshold. This procedure helps to reduce the overall power consumption of the diversity receiver 300.

It may for, example, also be provided that deactivating and activating diversity branches is carried out in a staggered fashion by using a plurality of thresholds. For example, if the Doppler frequency shift values become greater than a first threshold, a predetermined number of deactivated diversity branches will be activated. If the Doppler frequency shift values cross a second threshold, a further predetermined number of the deactivated diversity branches will be activated. This proceeding can be continued by using a non-limited number of thresholds. Analogously, a plurality of thresholds can also be provided for the deactivation of the diversity branches.

The diversity receiver 300 may, for example, determine the Doppler frequency shift values by measuring the rate with which the envelope of the received radio frequency signals cross a predetermined threshold level. The level crossing rate is proportional to the Doppler frequency shift. Another method for determining the Doppler frequency shift values is based on measuring the zero crossing rate of the in-phase or quadrature part of the received radio frequency signals.

The criterion according to which selective activation and deactivation of diversity branches is carried out depending on the Doppler frequency shift values can, for example, be combined with the criterion based on the channel estimation values as described above. Furthermore, other parameters can also contribute to the decision when antenna diversity is justified in light of the additional power consumption thereof. For example, a low battery power in a mobile device or a high signal-to-noise ratio or a high signal strength of the received radio frequency signals may lead to the decision to reduce diversity and to reduce the number of active diversity branches. Signals indicating the signal-to-noise ratio or the signal strength of the received radio frequency signals can for example be provided by the mixer circuits $302_1$ and $302_2$ to the controller 306.

According to one embodiment of the invention, operational modes of the diversity receiver 300 can be selected which are independent of the determined channel estimation values or Doppler frequency shift values. In one operational mode, a minimum number of diversity branches, for example only a single diversity branch, is active. This operational mode may, for example, be selected if the battery power is low. In another operational mode, a maximum number of diversity branches, for example all of the diversity branches, are active.

The activation and deactivation of diversity branches can in principle be carried out after every transmission of a symbol. Usually, however, longer time intervals are kept between points in time when diversity branches are activated or deactivated. The present invention contemplates both situations.

Figure 5:
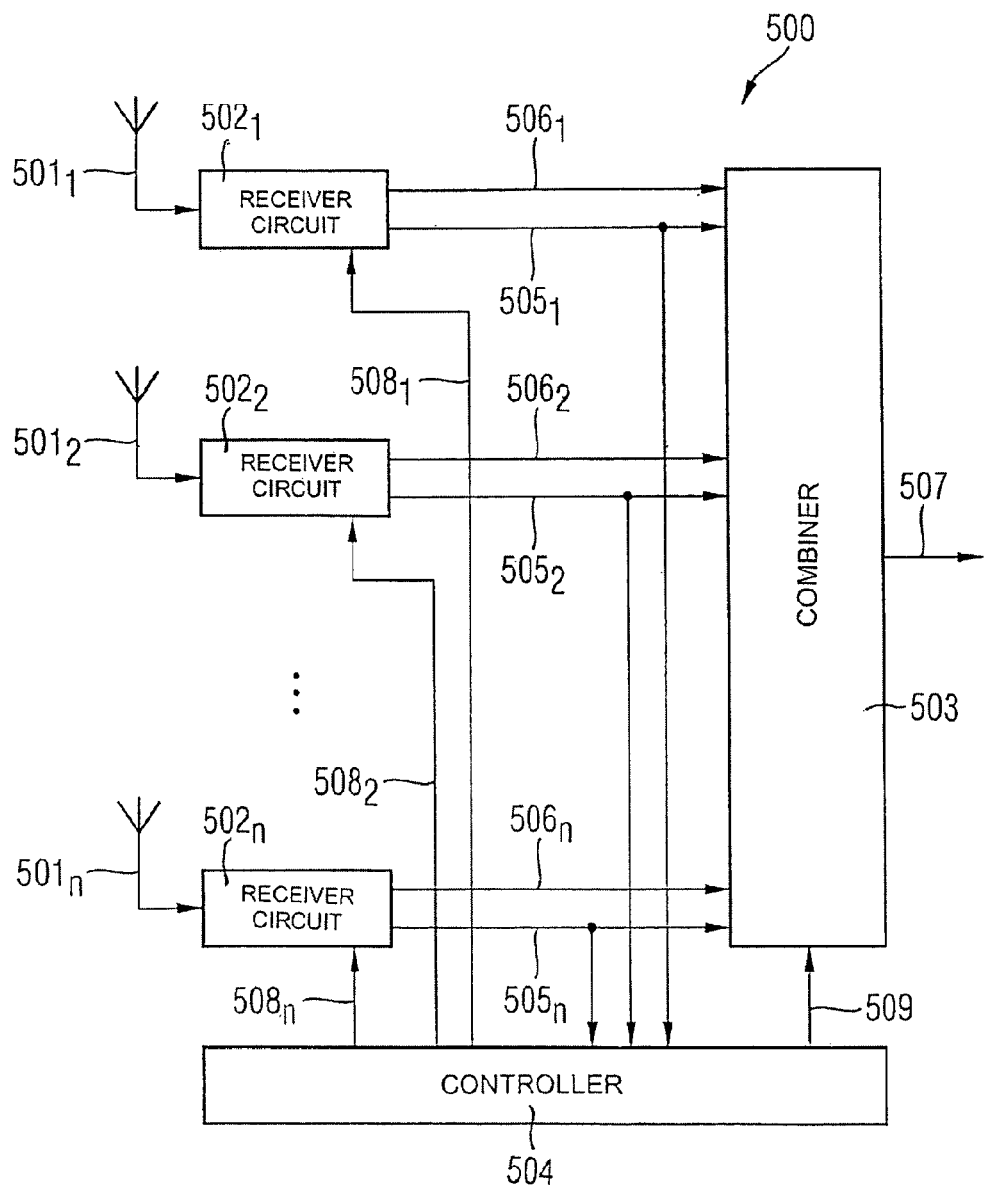
FIG. 5 schematically illustrates a further diversity receiver 500 according to a fourth exemplary embodiment of the invention.

Referring to FIG. 5, a block diagram of a diversity receiver 500 is shown which serves as another exemplary embodiment of the invention. The diversity receiver 500 comprises a plurality of antennas $501_1, 501_2, \ldots, 501_n$, a corresponding number of receiver circuits $502_1, 502_2, \ldots, 502_n$, a combiner 503 and a controller 504.

Each antenna $501_1, 501_2, \ldots, 501_n$ is coupled to an input terminal of one of the receiver circuits $502_1, 502_2, \ldots, 502_n$. Each antenna $501_1, 501_2, \ldots, 501_n$ together with the corresponding receiver circuit $502_1, 502_2, \ldots, 502_n$ forms a diversity branch of the diversity receiver 500. Each receiver circuit $502_1, 502_2, \ldots, 502_n$ comprises a channel estimator which determines channel estimation values $505_1, 505_2, \ldots, 505_n$ for the radio frequency signals received by the corresponding antenna $501_1, 501_2, \ldots, 501_n$. The receiver circuits $502_1, 502_2, \ldots, 502_n$ use the determined channel estimation values $505_1, 505_2, \ldots, 505_n$ to extract transmitted data $506_1, 506_2, \ldots, 506_n$ from the received radio frequency signals, respectively.

The extracted data $506_1, 506_2, \ldots, 506_n$ and the determined channel estimation values $505_1, 505_2, \ldots, 505_n$ are transferred to the combiner 503. The combiner 503 combines the data $506_1, 506_2, \ldots, 506_n$. Combining can be carried out by using a common combining method, such as maximum ratio combining, carrier selection, equal gain combining or any other form of combining. Combined data 507 are provided at an output terminal of the combiner 503 for further processing.

The channel estimation values $505_1, 505_2, \ldots, 505_n$ are also fed to the controller 504. The controller 504 selectively activates and deactivates the receiver circuits $502_1, 502_2, \ldots, 502_n$ via control signals $508_1, 508_2, \ldots, 508_n$ depending on the determined channel estimation values $505_1, 505_2, \ldots, 505_n$. Furthermore, the controller 504 controls the combiner 503 via a control signal 509.

Figure 6:
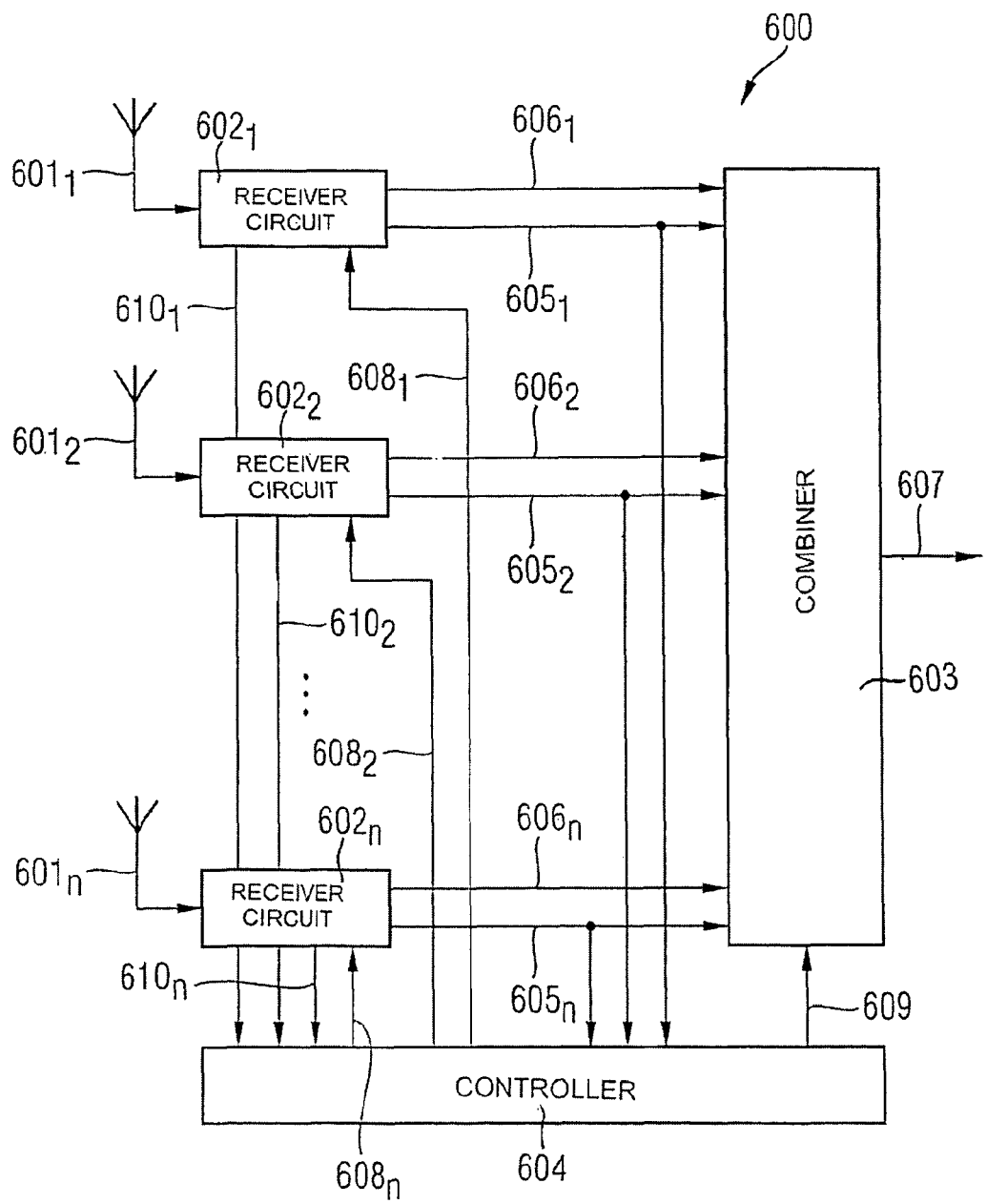
FIG. 6 schematically illustrates a further diversity receiver 600 according to a fifth exemplary embodiment of the invention.

Referring to FIG. 6, a block diagram of a diversity receiver 600 is shown which serves as another exemplary embodiment of the invention. The diversity receiver 600 comprises a plurality of antennas $601_1, 601_2, \ldots, 601_n$, a corresponding number of receiver circuits $602_1, 602_2, \ldots, 602_n$, a combiner 603 and a controller 604. The wiring and the function of the diversity receiver 600 is almost identical to the wiring and the function of the diversity receiver 500 shown in FIG. 5. The difference between the diversity receivers 500 and 600 is that the controller 604 uses Doppler frequency shift values $610_1, 610_2, \ldots, 610_n$ instead of channel estimation values $605_1, 605_2, \ldots, 605_n$ in order to control the activation and deactivation of the receiver circuits $602_1, 602_2, \ldots, 602_n$. The Doppler frequency shift values $610_1, 610_2, \ldots, 610_n$ are generated by the receiver circuits $602_1, 602_2, \ldots, 602_n$ and transferred to the controller 604.

The diversity receivers 500 and 600 shown in FIGS. 5 and 6 may for example comprise all features or a selection of the features of the diversity receiver 300 which was described above.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A diversity receiver, comprising:
   a plurality of antennas configured to receive radio frequency signals;
   a plurality of receiver circuits each coupled to one of the antennas and configured to process the received radio frequency signals;
   a Doppler frequency shift calculator coupled to at least one of the receiver circuits and configured to determine at least one of Doppler frequency shift value for the respective received radio frequency signals; and
   a controller coupled to the Doppler frequency shift calculator and to at least one of the receiver circuits, and configured to selectively activate and deactivate the at least one receiver circuit based on the determined at least one of Doppler frequency shift value.

2. The diversity receiver of claim 1, wherein the controller is configured to deactivate the at least one receiver circuit if the determined at least one of Doppler frequency shift value exceeds a predetermined threshold.

3. The diversity receiver of claim 2, wherein the controller is configured to activate the at least one receiver circuit if the determined at least one of Doppler frequency shift value exceeds a further predetermined threshold.

4. The diversity receiver of claim 1, wherein
   a first plurality of the antennas and the receiver circuits coupled to the first plurality of antennas form a first group, and
   the Doppler frequency shift calculator coupled is coupled to the receiver circuits of the first group and is configured to determine Doppler frequency shift values for the radio frequency signals received by the antennas of the first group.

5. The diversity receiver of claim 4, wherein
   a plurality of the receiver circuits form a second group, and
   the controller is coupled to the receiver circuits of the second group and is configured to deactivate the receiver circuits of the second group if a predetermined number of the determined Doppler frequency shift values for the radio frequency signals received by a predetermined number of antennas of the first group exceeds a predetermined threshold.

6. The diversity receiver of claim 1, wherein an operational mode of the diversity receiver is selectable in which a predetermined number of the receiver circuits is activated based on the selected operational mode.

7. The diversity receiver of claim 1, wherein the radio frequency signals received by the antennas are multi-carrier signals.

8. A diversity receiver, comprising:
   a plurality of antennas configured to receive radio frequency signals;
   a plurality of receiver circuits for processing the received radio frequency signals;
   a Doppler frequency shift calculator for determining at least one Doppler frequency shift value for the respective received radio frequency signals; and
   a controller for selectively activating and deactivating at least one of the plurality of receiver circuits for processing the received radio frequency signals based on the determined at least one Doppler frequency shift value.

9. The diversity receiver of claim 8, wherein the controller is configured to deactivate the at least one receiver circuit if the determined the Doppler frequency shift value exceeds a predetermined threshold.

10. The diversity receiver of claim 8, wherein
    a first plurality of the antennas and the receiver circuits coupled to the first plurality of antennas form a first group, and
    the Doppler frequency shift calculator is coupled to the receiver circuits of the first group and is configured to determine Doppler frequency shift values for the radio frequency signals received by the antennas of the first group.

11. The diversity receiver of claim 8, wherein an operational mode of the diversity receiver is selectable in which a predetermined number of the receiver circuits is activated based on the selected operational mode.

12. The diversity receiver of claim 8, wherein the radio frequency signals received by the antennas are multi-carrier signals.

13. A method, comprising:
    receiving radio frequency signals on a plurality of antennas;
    processing the received radio frequency signals using a plurality of receiver circuits, wherein the radio frequency signals received on each antenna are processed in an individual receiver circuit, respectively;
    determining at least one Doppler frequency shift value for the radio frequency signals received on at least one of the antennas; and
    selectively activating or deactivating at least one of the receiver circuits based on the determined at least one Doppler frequency shift value.

14. The method of claim 13, wherein the at least one receiver circuit is deactivated if the determined at least one Doppler frequency shift value crosses a predetermined threshold in a predetermined direction.

15. The method of claim 14, wherein the at least one receiver circuit is activated if the determined at least one Doppler frequency shift value crosses a further predetermined threshold in a direction opposite to the predetermined direction.

* * * * *